United States Patent
Hao et al.

(10) Patent No.: US 10,635,812 B2
(45) Date of Patent: Apr. 28, 2020

(54) METHOD AND APPARATUS FOR IDENTIFYING MALICIOUS SOFTWARE

(71) Applicant: Tencent Technology (Shenzhen) Company Limited, Shenzhen (CN)

(72) Inventors: Xu Hao, Shenzhen (CN); Yang Yi, Shenzhen (CN); Yu Tao, Shenzhen (CN); Li Lu Xin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 217 days.

(21) Appl. No.: 15/834,985

(22) Filed: Dec. 7, 2017

(65) Prior Publication Data

US 2018/0096146 A1 Apr. 5, 2018

Related U.S. Application Data

(63) Continuation of application No. PCT/CN2016/101578, filed on Oct. 9, 2016.

(30) Foreign Application Priority Data

Nov. 18, 2015 (CN) .......................... 2015 1 0796066

(51) Int. Cl.
*G06F 21/00* (2013.01)
*G06F 21/56* (2013.01)
(Continued)

(52) U.S. Cl.
CPC .............. *G06F 21/563* (2013.01); *G06F 8/10* (2013.01); *G06F 8/20* (2013.01); *G06F 8/427* (2013.01);
(Continued)

(58) Field of Classification Search
CPC ........ G06F 21/563; G06F 21/566; G06F 8/53; G06F 8/427; G06F 8/20; G06F 8/10;
(Continued)

(56) References Cited

U.S. PATENT DOCUMENTS 6,496,817 B1 * 12/2002 Whang ............. G06F 16/90344
8,135,994 B2 * 3/2012 Keromytis .............. G06F 11/08
714/38.11

(Continued)

FOREIGN PATENT DOCUMENTS

CN 102031042 A 4/2011
CN 102034042 A 4/2011
(Continued)

OTHER PUBLICATIONS

Alam et al., "Random Forest Classification for Detecting Android Malware", IEEE International Conference on Green Computing and Communications and IEEE Internet of Things and IEEE Cyber, Physical and Social Computing, Date of Conference: Aug. 20-23. (Year: 2013).*

(Continued)

*Primary Examiner* — Morshed Mehedi
(74) *Attorney, Agent, or Firm* — Brinks Gilson & Lione

(57) ABSTRACT

A method and apparatus are disclosed for identifying malicious software in the technical field of computers. The method includes: obtaining, according to a source code of to-be-detected software, a function call diagram of the software; generating a feature sequence of the software according to the function call diagram, the feature sequence including an eigenvalue of at least one feature, the feature being a function in a preset function library, and the eigenvalue of the feature being a quantity of times of calling of the function by the software; and identifying whether the software is malicious software according to the feature sequence (Continued)

and a random forest, the random forest including at least one decision tree, and the decision tree including reference eigenvalues of multiple features. The apparatus includes: an obtaining module, a generation module, and an identification module. The present disclosure may improve identification accuracy.

20 Claims, 12 Drawing Sheets

(51) Int. Cl.
G06F 8/75 (2018.01)
G06N 5/00 (2006.01)
G06N 20/20 (2019.01)
G06F 8/10 (2018.01)
G06F 8/20 (2018.01)
G06F 8/41 (2018.01)
G06F 8/53 (2018.01)
G06N 5/04 (2006.01)
G06F 8/61 (2018.01)
G06F 21/62 (2013.01)

(52) U.S. Cl.
CPC .............. *G06F 8/53* (2013.01); *G06F 8/75* (2013.01); *G06F 21/566* (2013.01); *G06N 5/003* (2013.01); *G06N 5/04* (2013.01); *G06N 20/20* (2019.01); *G06F 8/61* (2013.01); *G06F 21/62* (2013.01)

(58) Field of Classification Search
CPC .. G06F 21/62; G06F 8/61; G06F 8/75; G06N 5/04; G06N 20/20; G06N 5/003
See application file for complete search history.

(56) References Cited

U.S. PATENT DOCUMENTS

| 8,375,450 | B1* | 2/2013 | Oliver | G06F 21/564 |
| | | | | 726/24 |
| 8,401,982 | B1* | 3/2013 | Satish | G06N 20/00 |
| | | | | 706/20 |
| 9,158,604 | B1* | 10/2015 | Christodorescu | G06F 9/54 |
| 9,940,459 | B1* | 4/2018 | Saxe | G06F 16/116 |
| 2003/0161296 | A1* | 8/2003 | Butler | H04L 29/06 |
| | | | | 370/352 |
| 2007/0083813 | A1* | 4/2007 | Lui | G06F 11/3612 |
| | | | | 715/709 |
| 2009/0281981 | A1 | 11/2009 | Chen et al. | |
| 2010/0169026 | A1* | 7/2010 | Sorenson | G16B 30/00 |
| | | | | 702/20 |
| 2010/0218171 | A1* | 8/2010 | Munson | G06F 11/3644 |
| | | | | 717/127 |
| 2012/0011371 | A1* | 1/2012 | Lee | G06F 9/4486 |
| | | | | 713/190 |
| 2015/0332043 | A1* | 11/2015 | Russello | G06F 11/30 |
| | | | | 726/23 |

FOREIGN PATENT DOCUMENTS

| CN | 102034050 A | 4/2011 |
| CN | 103279711 A | 9/2013 |
| CN | 103473506 A | 12/2013 |
| CN | 103870754 A | 6/2014 |
| CN | 104361141 A | 2/2015 |
| CN | 104376262 A | 2/2015 |
| CN | 104834857 A | 8/2015 |
| CN | 104866763 A | 8/2015 |
| CN | 105024877 A | 11/2015 |
| CN | 105046152 A | 11/2015 |
| WO | WO 2014/149080 A1 | 9/2014 |

OTHER PUBLICATIONS

Alazab et al., "Zero-day malware detection based on supervised learning algorithms of API call signatures", AusDM '11: Proceedings of the Ninth Australasian Data Mining Conference—vol. 121Dec. 2011 pp. 171-182 (Year: 2011).*
Office Action with concise English Translation dated Apr. 22, 2019 for Chinese Application No. 201510796066.0, 12 pages.
Peiravian, Naser et al., "Machine Learning for Android Malware Detection Using Permission and API Calls," 2013 IEEE 25th International Conference on Tools with Artificial Intelligence, 2013, Feb. 10, 2014, pp. 300-305.
International Search Report and Written Opinion dated Jan. 20, 2017 for PCT Application No. PCT/CN2016/101578, 12 pages.
Office Action with concise English Translation dated Jan. 21, 2019 for Chinese Application No. 201510796066.0, 15 pages.

* cited by examiner

METHOD AND APPARATUS FOR IDENTIFYING MALICIOUS SOFTWARE

RELATED APPLICATION

The application is a continuation of Patent Cooperation Treaty Patent Application No. PCT/CN2016/101578, filed on Oct. 9, 2016, which claims priority to China Patent Application No. 201510796066.0, filed with the Chinese Patent Office on Nov. 18, 2015, which are both incorporated herein by reference in their entirety.

FIELD OF THE TECHNOLOGY

The present disclosure relates to the technical field of computers, and in particular, to a method and an apparatus for identifying malicious software.

BACKGROUND OF THE DISCLOSURE

With the popularization and development of Android terminals, various types of malicious software emerge. In addition, according to statistics, over four hundred thousand types of new malicious software are found in the first quarter of 2015. That is, a new piece of malicious software is found every 18 seconds globally. These pieces of malicious software are downloaded onto a terminal of a user while not being known by the user, which brings a potential security risk to information and property of the user.

To improve the security of information and the property of the user, currently, a server may identify, by using the following method, whether software that is being installed, has been installed, or has been prevented from being installed by the terminal is malicious software, specifically: calculating a hash value of to-be-detected software, and determining whether the hash value is included in a hash value set, the hash value set including a hash value of malicious software; determining that the software is malicious software if the hash value set includes the hash value; and determining that the software is not malicious software if the hash value set does not include the hash value.

In a process for implementing the present disclosure, the existing technology has at least the following problem:

Identifying whether software is malicious software according to a hash value of the software may be easily bypassed by a virus creator, leading to low identification accuracy. For example, a new resource is added to malicious software or an original code is modified, so that a hash value of the malicious software changes, so as to detect that the malicious software is not malicious software, that is, incorrect determining occurs, leading to low identification accuracy.

SUMMARY

To resolve a problem of the existing technology, the present disclosure provides a method and an apparatus for identifying malicious software.

According to one aspect of the present disclosure, a method for identifying malicious software is provided, the method including: obtaining, according to a source code of to-be-detected software, a function call diagram of the software;
generating a feature sequence of the software according to the function call diagram, the feature sequence including an eigenvalue of at least one feature, the feature being a function in a preset function library, and the eigenvalue of the feature being a quantity of times of calling of the function by the software; and
identifying whether the software is malicious software according to the feature sequence and a random forest, the random forest including at least one decision tree, and the decision tree including reference eigenvalues of multiple features.

According to another aspect of the present disclosure, an apparatus for identifying malicious software is provided, the apparatus including:
an obtaining module, configured to, obtain, according to a source code of to-be-detected software, a function call diagram of the software;
a generation module, configured to generate a feature sequence of the software according to the function call diagram, the feature sequence including an eigenvalue of at least one feature, the feature being a function in a preset function library, and the eigenvalue of the feature being a quantity of times of calling of the function by the software; and
an identification module, configured to identify whether the software is malicious software according to the feature sequence and a random forest, the random forest including at least one decision tree, and the decision tree including reference eigenvalues of multiple features.

According to another aspect of the present disclosure, an apparatus for identifying malicious software is provided, including one or more processors and a storage medium storing operation instructions, when running the operation instructions in the storage medium, the processors being configured to perform the following steps:
obtaining, according to a source code of to-be-detected software, a function call diagram of the software;
generating a feature sequence of the software according to the function call diagram, the feature sequence including an eigenvalue of at least one feature, the feature being a function in a preset function library, and the eigenvalue of the feature being a quantity of times of calling of the function by the software; and
identifying whether the software is malicious software according to the feature sequence and a random forest, the random forest including at least one decision tree, and the decision tree including reference eigenvalues of multiple features.

According to some embodiments, a function call diagram of the software is obtained according to a source code of to-be-detected software; a feature sequence of the software is generated according to the function call diagram, the feature sequence including an eigenvalue of at least one feature, the feature being a function in a preset function library, and the eigenvalue of the feature being a quantity of times of calling of the function by the software; and whether the software is malicious software is identified according to the feature sequence and a random forest, the random forest including at least one decision tree, and the decision tree including reference eigenvalues of multiple features. In the present disclosure, whether the software is malicious software is identified by using the feature sequence and the random forest, so as not to be affected by a virus creator, thereby improving identification accuracy.

DESCRIPTION OF EMBODIMENTS

To make the objectives, technical solutions, and advantages of the present disclosure clearer, the following further describes the implementation manners of the present disclosure in detail with reference to the accompanying drawings.

Embodiment 1

Figure 1:
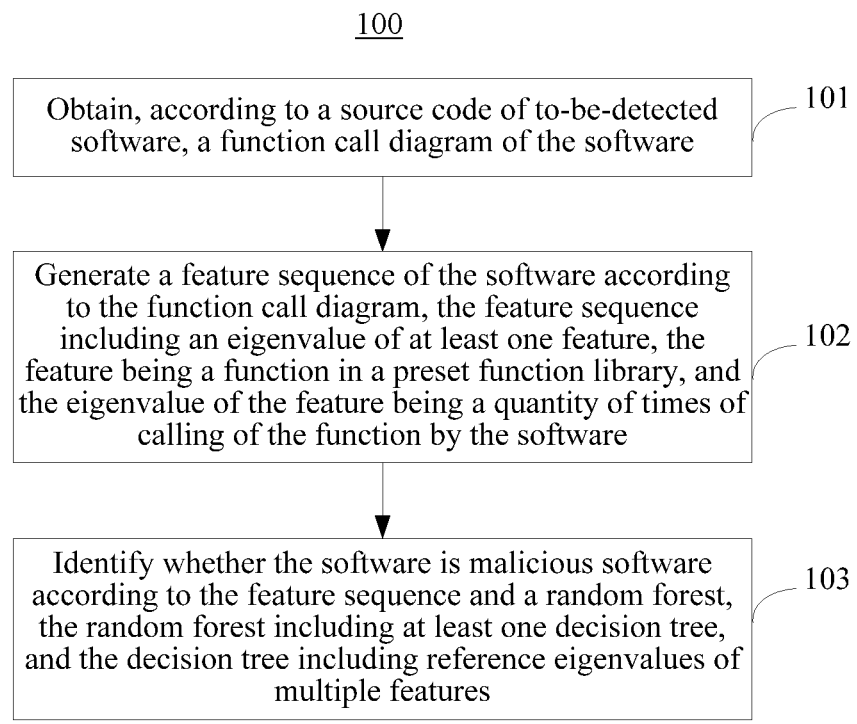
FIG. 1 is a flowchart of a method for identifying malicious software according to Embodiment 1.

An embodiment provides a method for identifying malicious software. The method may be executed by a server. Referring to a flowchart 100 shown in FIG. 1, the method includes:

Step 101: Obtain, according to a source code of to-be-detected software, a function call diagram of the software.

Step 102: Generate a feature sequence of the software according to the function call diagram, the feature sequence including an eigenvalue of at least one feature, the feature being a function in a preset function library, and the eigenvalue of the feature being a quantity of times of calling of the function by the software.

Step 103: Identify whether the software is malicious software according to the feature sequence and a random forest, the random forest including at least one decision tree, and the decision tree including reference eigenvalues of multiple features.

In this embodiment, a function call diagram of the software is obtained according to a source code of to-be-detected software; a feature sequence of the software is generated according to the function call diagram, the feature sequence including an eigenvalue of at least one feature, the feature being a function in a preset function library, and the eigenvalue of the feature being a quantity of times of calling of the function by the software; and whether the software is malicious software is identified according to the feature sequence and a random forest, the random forest including at least one decision tree, and the decision tree including reference eigenvalues of multiple features. In the present disclosure, whether the software is malicious software is identified by using the feature sequence and the random forest, so as not to be affected by a virus creator, thereby improving identification accuracy.

Embodiment 2

Figure 2A:
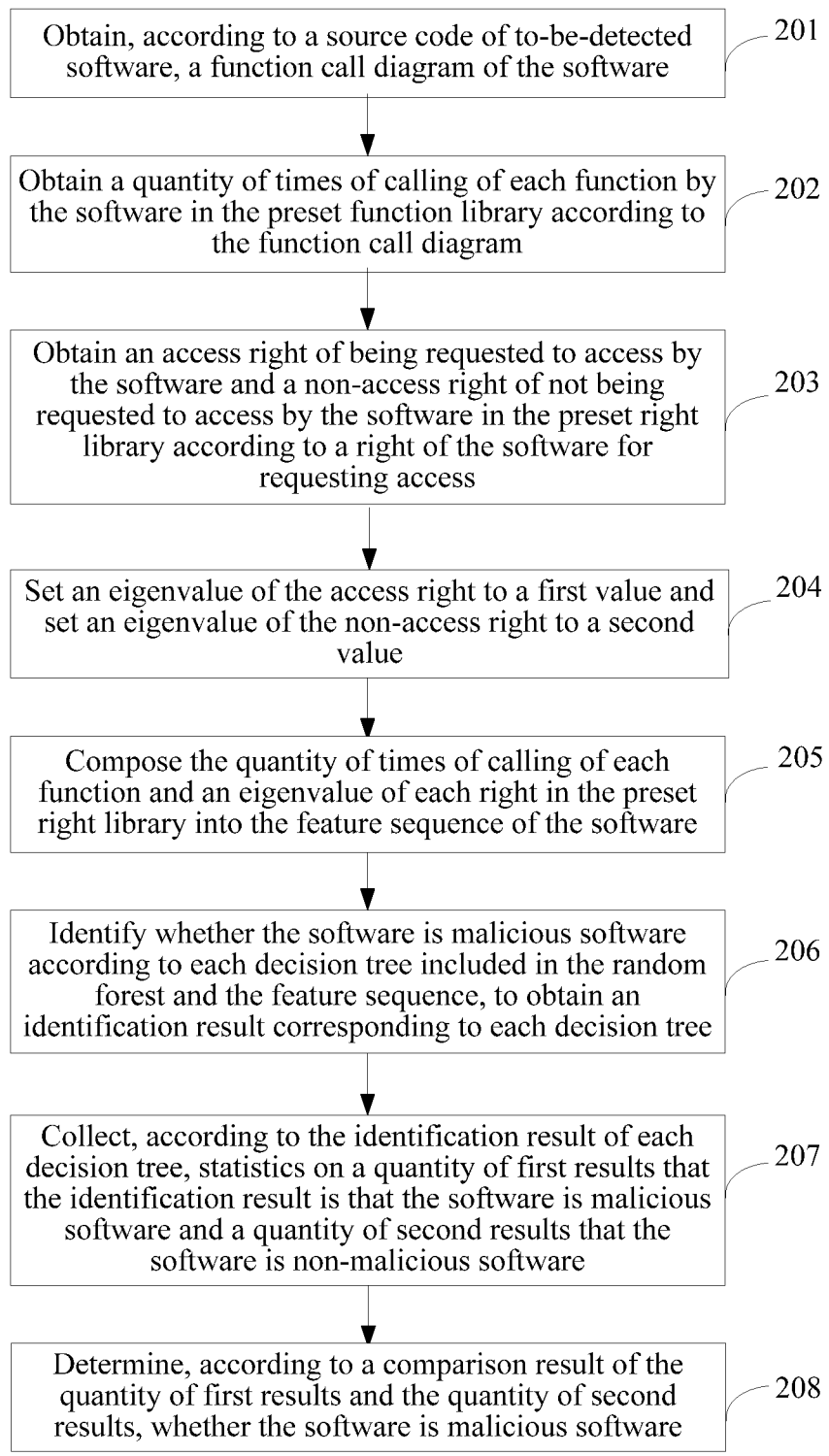
FIG. 2A is a flowchart of a method for identifying malicious software according to Embodiment 1.

An embodiment provides a method for identifying malicious software. The method may be executed by a server. Referring to a flowchart 200 shown in FIG. 2A, the method includes:

Step 201: Obtain, according to a source code of to-be-detected software, a function call diagram of the software.

The to-be-detected software may be software that is being installed, has been installed, or is not installed by the terminal.

The function call diagram is a static expression manner of showing a function call relationship in the source code by using a directed graph. The function call diagram of the software includes functions called by the software and a relationship between the functions. In addition, the function call diagram includes nodes and directed line segments. The nodes indicate the functions, the directed line segments indicate a call relationship between the functions, and directions of the directed line segments point to a called function from a calling function.

This step may be performed by using the following steps (1) and (2), including:

(1) Decompile the source code of the to-be-detected software, to obtain a decompilation code of the software.

Using an application developed by the Android system as an example, a developer may generate an APK (Android Package, Android application) file when developing the software. The APK file is a compressed file, a server decompresses the APK file to obtain a classes.dex file, and the classes.dex file includes the source code of the software. Alternatively, a developer may generate a classes.elf file when developing the software, and the classes.elf file includes the source code of the software.

In this step, the server decompiles the source code included in the classes.dex file or the classes.elf file, to obtain a decompilation code of the software.

(2): Parse the decompilation code, to obtain the function call diagram of the software.

The server parses the decompilation code, to obtain functions called by the software and a relationship between the functions, and presents the functions called by the software and the relationship between the functions in a manner of a function call diagram, to obtain the function call diagram of the software.

Figure 2B:
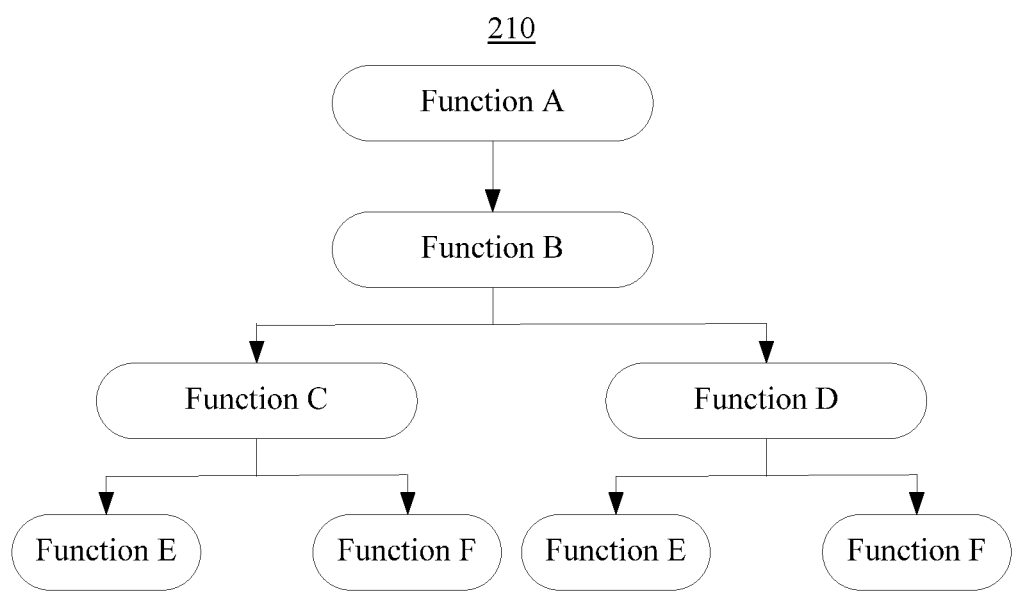
FIG. 2B is a schematic diagram of a function call diagram of software according to Embodiment 2.

For example, the functions called by the software include functions A, B, C, D, E, and F. In addition, the function A calls the function B, the function B calls the function C and the function D. The function C and the function D both call the function E and the function F. The server obtains a function call diagram 210 of the software, as shown in FIG. 2B.

Step 202: Obtain a quantity of times of calling of each function by the software in the preset function library according to the function call diagram.

The preset function library is used for storing all functions that the software may need. Specifically, this step may be:

For each function in the preset function library, the server obtains a quantity of times of occurrence of the function in the function call diagram according to the function call diagram.

For example, the preset function library includes eight functions, that is for example, functions A, B, C, D, E, F, G and H. In addition, the functions A, B, C, and D separately occurs once in the function call diagram, and then quantities of times of calling of the functions A, B, C, and D are all 1. The functions E and F separately occur twice in the function call diagram, and then quantities of times of calling of the functions E and F are both 2. The functions G and H do not occur in the function call diagram, and then quantities of times of calling of the functions G and H are both 0.

It should be noted that to increase identification accuracy, a right of the software for requesting access in step 203 may be combined to generate a feature sequence of the software.

Step 203: Obtain an access right of being requested to access by the software and a non-access right of not being requested to access by the software in the preset right library according to a right of the software for requesting access.

As an example, the preset right library is used for storing all rights that the software may access and that may include obtaining device information, sending a short messaging service message, self starting, accessing a geographical location, obtaining an address book, and the like.

The right of the software for requesting access is obtained from an installation package of the software. The right of the software for requesting access is an access right, and a right except the access right in the preset right library is a non-access right.

For example, the installation package of the software includes an AndroidManifest.xml file. The AndroidManifest.xml file includes a right request message of the software. The right request message carries the right of the software for requesting access. Therefore, the step of obtaining the right of the software for requesting access from the installation package of the software may be:

Obtain the AndroidManifest.xml file of the software from the installation package of the software, obtain the right request message of the software from the AndroidManifest.xml file, and obtain the right of the software for requesting access from the right request message of the software.

For example, the right of the software for requesting access is sending a short messaging service message and accessing a geographical location. Rights included in the preset right library are obtaining device information, sending a short messaging service message, self starting, accessing a geographical location, and obtaining an address book. Therefore, the access rights of being requested to access by the software in the preset right library are sending a short messaging service message and accessing a geographical location. The non-access rights of not being requested to access by the software are: obtaining device information, self starting, and obtaining an address book.

Step 204: Set an eigenvalue of the access right to a first value and set an eigenvalue of the non-access right to a second value.

The first value is not equal to the second value, and the first value and the second value may both be set and changed according to requirements. In this embodiment, the first value and the second value are not specifically defined. For example, the first value is 1, and the second value is 0.

As an example, this step may be specifically: Set the eigenvalue of the access right to 1, and set the eigenvalue of the non-access right to 0.

For example, the eigenvalues of the access rights: sending a short messaging service message and accessing a geographical location are separately set to 1, and the eigenvalues of the non-access rights: obtaining device information, self starting, and obtaining an address book are separately set to 0.

It should be noted that step 203 and step 204 are optional steps that may be added to improve identification accuracy. According to some embodiments, step 205 is directly performed after step 202 is performed.

Step 205: Compose the quantity of times of calling of each function and an eigenvalue of each right in the preset right library into the feature sequence of the software.

The feature sequence includes an eigenvalue of at least one feature. The feature is a function in the preset function library, or the feature is a combination of a function in the preset function library and a right in the preset right library.

When the feature is a function in the preset function library, the eigenvalue of the feature is a quantity of times of calling of the function by the software. When the feature is a right in the preset right library, the eigenvalue of the feature is used for indicating whether the right is an eigenvalue accessed by the software.

For example, the preset function library includes the functions A, B, C, D, E, F, G, and H. Quantities of times of calling of the functions A, B, C, D, E, F, G, and H are respectively 1, 1, 1, 1, 2, 2, 0, and 0. The rights included in the preset right library are obtaining device information, sending a short messaging service message, self starting, accessing a geographical location, and obtaining an address book. Eigenvalues corresponding to obtaining device information, sending a short messaging service message, self starting, accessing a geographical location, and obtaining an address book are respectively 0, 1, 0, 1, and 0. Therefore, the feature sequence of the software is [1, 1, 1, 1, 2, 2, 0, 0, 0, 1, 0, 1, 0].

It should be noted that if steps 203 and 204 are not performed but step 205 is directly performed after step 202 is performed, step 205 may be:

Compose the quantity of times of calling of each function into the feature sequence of the software.

For example, the preset function library includes the functions A, B, C, D, E, F, G, and H. Quantities of times of calling of the functions A, B, C, D, E, F, G, and H are respectively 1, 1, 1, 1, 2, 2, 0, and 0. Therefore, the feature sequence of the software is [1, 1, 1, 1, 2, 2, 0, 0].

Step 206: Identify whether the software is malicious software according to each decision tree included in the random forest and the feature sequence, to obtain an identification result corresponding to each decision tree.

The random forest includes at least one decision tree. Each of the at least one decision tree includes multiple feature paths. Each of the multiple feature paths includes multiple reference eigenvalues. Each feature path corresponds to an identification result. The identification result includes that the software is malicious software and that the software is non-malicious software.

Before this step, the server needs to first generate at least one decision tree, and the at least one decision tree composes the random forest. For each of the at least one decision tree, the server may generate the decision tree by using the following steps (1) and (2), including:

(1) Determine, according to a sample feature sequence set, a location, in the decision tree, of each of some features in the sample feature sequence set and a reference eigenvalue of each feature.

The sample feature sequence set includes a sample feature sequence of at least one piece of malicious software and a sample feature sequence of at least one piece of non-malicious software.

This step may be performed by using the following steps (1-1) to (1-4), including:

(1-1): Select a preset feature set corresponding to a first location from the sample feature sequence set.

In this embodiment, the decision tree is a binary tree, that is, each node includes only two sub-nodes. When generating the decision tree, the server first determines a feature and a reference eigenvalue that correspond to a root node of the decision tree, then separately determines features and reference eigenvalues that corresponding to two primary internal nodes included in the root node, then separately determines features and reference eigenvalues that correspond to two secondary internal nodes included in two primary internal nodes, and at last, determines a feature and a reference eigenvalue that correspond to a leave node of the decision tree.

The first location is a location that is nearest to the root node in the decision tree and at which the feature and the reference eigenvalue are to be determined. For example, when the server does not determine the feature and the reference eigenvalue of the root node of the decision tree, the first location is the root node. When the server determines the feature and the reference eigenvalue of the root node but does not determine a feature and a reference eigenvalues of a primary internal node included in the root node, the first location is the primary internal node included in the root node.

In this step, using that the first location is the root node as an example for description, this step may be:

Sample the feature sequence in the sample feature sequence set, to obtain a preset feature set corresponding to the root node.

If the sample feature sequence is a sample feature sequence of malicious software, an identification result is represented by 1. If the sample feature sequence is a sample feature sequence of non-malicious software, an identification result is represented by 0. The sample feature sequence set may be represented as:

$$\begin{bmatrix} 0 & 1 & 0 & 1 & 0 & 1 & 1 & 1 & 1 & 2 & 2 & 0 & 0 & 0 \\ 1 & 0 & 1 & 0 & 0 & 0 & 1 & 2 & 3 & 1 & 2 & 1 & 1 & 1 \\ . & . & . & . & . & . & . & . & . & . & . & . & . & . \\ . & . & . & . & . & . & . & . & . & . & . & . & . & . \\ 1 & 0 & 0 & 1 & 1 & 2 & 0 & 1 & 3 & 0 & 1 & 0 & 0 & 1 \end{bmatrix}$$

It should be noted that ranking of features in the feature sequence set is separately the functions A, B, C, D, E, F, G, and H, obtaining device information, sending a short messaging service message, self starting, accessing a geographical location, and obtaining an address book.

To simplify an operation, it is assumed that the sample feature sequence set is:

$$\begin{bmatrix} 1 & 0 & 0 & 3 & 0 \\ 1 & 0 & 0 & 2 & 0 \\ 1 & 1 & 0 & 2 & 1 \\ 1 & 1 & 1 & 3 & 1 \\ 1 & 0 & 0 & 3 & 0 \\ 2 & 0 & 0 & 3 & 0 \\ 2 & 0 & 0 & 2 & 0 \\ 2 & 1 & 1 & 2 & 1 \\ 2 & 0 & 1 & 1 & 1 \\ 2 & 0 & 1 & 1 & 0 \end{bmatrix}$$

The sample feature sequence set is represented, as shown in Table 1:

TABLE 1

| ID | Feature 1 | Feature 2 | Feature 3 | Feature 4 | Identification result |
|---|---|---|---|---|---|
| 1 | 1 | 0 | 0 | 3 | 0 |
| 2 | 1 | 0 | 0 | 2 | 0 |
| 3 | 1 | 1 | 0 | 2 | 1 |
| 4 | 1 | 1 | 1 | 3 | 1 |
| 5 | 1 | 0 | 0 | 3 | 0 |
| 6 | 2 | 0 | 0 | 3 | 0 |
| 7 | 2 | 0 | 0 | 2 | 0 |
| 8 | 2 | 1 | 1 | 2 | 1 |
| 9 | 2 | 0 | 1 | 1 | 1 |
| 10 | 2 | 0 | 1 | 1 | 0 |

The server performs row-column sampling on the sample feature sequence set, and the obtained preset feature set corresponding to the root node is shown in Table 2:

TABLE 2

| ID | Feature 1 | Feature 2 | Feature 3 | Feature 4 | Identification result |
|---|---|---|---|---|---|
| 5 | 1 | 0 | 1 | 3 | 0 |
| 8 | 2 | 1 | 2 | 2 | 1 |
| 1 | 1 | 0 | 1 | 3 | 0 |
| 9 | 2 | 0 | 2 | 1 | 1 |
| 4 | 1 | 1 | 1 | 3 | 1 |
| 2 | 1 | 0 | 1 | 2 | 0 |
| 3 | 1 | 1 | 1 | 2 | 1 |
| 10 | 2 | 0 | 2 | 1 | 0 |
| 2 | 1 | 0 | 1 | 2 | 0 |
| 3 | 1 | 1 | 1 | 2 | 1 |

(2): Calculate a Gini coefficient of each eigenvalue included in the preset feature set.

A process for calculating the Gini coefficient of the eigenvalue is the existing technology and is not described in detail herein.

For example, the server calculates the Gini coefficient of each eigenvalue included in Table 2. First, IDs whose features 1 have eigenvalues of 1 are samples of 5, 1, 4, 2, 3, 2, and 3, seven samples in total. In the seven samples, IDs whose identification results are 0 are 5, 1, 2, and 2, four samples in total. Therefore, a probability for the eigenvalue of the feature 1 being 1 and the identification result being 0 is 4/7, and a probability for the eigenvalue of the feature 1 being 1 and the identification result being 1 is 3/7. IDs whose features 1 have eigenvalues of 2 are 8, 9, and 10, three samples in total. Therefore, a probability for the eigenvalue of the feature 1 being 2 and the identification result being 0 is 1/3, and a probability for the eigenvalue of the feature 1 being 2 and the identification result being 1 is 2/3.

Therefore, the Gini coefficient $$Gini(D, feature1 = 1) = \frac{7}{10}\left(2 \times \frac{4}{7} \times \frac{3}{7}\right) + \frac{3}{10}\left(2 \times \frac{2}{3} \times \frac{1}{3}\right).$$

A Gini coefficient of each eigenvalue of each feature in Table 2 is calculated. For example, the Gini coefficient of each eigenvalue of each feature is shown in the following:

Gini (D, feature 1=1)=0.5;
Gini (D, feature 1=2)=0.5;
Gini (D, feature 2=0)=0.4;
Gini (D, feature 2=1)=0.4;
Gini (D, feature 3=1)=0.5;
Gini (D, feature 3=2)=0.5;

Gini (D, feature 4=1)=0.2;
Gini (D, feature 4=2)=0.3;
Gini (D, feature 4=3)=0.4.

(3) Determine an eigenvalue corresponding to a minimum Gini coefficient and a feature corresponding to the minimum Gini coefficient.

The server selects the minimum Gini coefficient from the Gini coefficient of each eigenvalue included in the preset feature set and selects the feature corresponding to the minimum Gini coefficient from the preset feature set.

For example, the minimum Gini coefficient is 0.2, the eigenvalue corresponding to the minimum Gini coefficient is 1, and the feature corresponding to the minimum Gini coefficient is feature 4.

(4): Use the first location as a location of the determined feature and use the determined eigenvalue as a reference eigenvalue of the determined feature.

According to step (1) to step (4), a location, in the decision tree, of each feature in the preset feature set and a reference eigenvalue of each feature are determined.

For example, the first location is used as a location of feature 4, and an eigenvalue of 1 is used as a reference eigenvalue of feature 4.

Further, according to feature 4=1, the preset feature set is divided into two parts, which are separately a part in which an eigenvalue of feature 4 is less than or equal to 1, as shown in Table 3, and the other part in which an eigenvalue of feature 4 is greater than 1, as shown in Table 4.

TABLE 3

| ID | Feature 1 | Feature 2 | Feature 3 | Feature 4 | Identification result |
|---|---|---|---|---|---|
| 9 | 2 | 0 | 2 | 1 | 1 |
| 10 | 2 | 0 | 2 | 1 | 0 |

TABLE 4

| ID | Feature 1 | Feature 2 | Feature 3 | Feature 4 | Identification result |
|---|---|---|---|---|---|
| 5 | 1 | 0 | 1 | 3 | 0 |
| 8 | 2 | 1 | 2 | 2 | 1 |
| 1 | 1 | 0 | 1 | 3 | 0 |
| 4 | 1 | 1 | 1 | 3 | 1 |
| 2 | 1 | 0 | 1 | 2 | 0 |
| 3 | 1 | 1 | 1 | 2 | 1 |
| 2 | 1 | 0 | 1 | 2 | 0 |
| 3 | 1 | 1 | 1 | 2 | 1 |

Further, the first location is selected as two primary internal nodes included in the root node, which are separately referred to as a first primary internal node and a second primary internal node. Then a preset feature set corresponding to the first primary internal node is shown in Table 3, and a preset feature set corresponding to the second primary internal node is shown in Table 4. A feature and a reference eigenvalue of the first primary internal node and a feature and a reference eigenvalue of the second primary internal node are determined according to the foregoing method until a feature and a reference eigenvalue of a leave node of the decision tree is determined. In this case, a decision tree is generated, such as a first decision tree 220 shown in FIG. 2C.

(2): Compose the reference eigenvalue of each feature into the decision tree according to the location, in the decision tree, of each feature.

Multiple feature paths are generated according to the location of each feature in the decision tree and the reference eigenvalue corresponding to each feature, and the multiple feature paths are composed into the decision tree.

For any decision tree in the random forest, for east of description, the any decision tree is referred to as a first decision tree. Then the server may obtain, according to the following steps (A) and (B), an identification result of identifying, by the first decision tree, whether the software is malicious software, including:

(A): Obtain, according to the feature sequence. a feature path matching the feature sequence from multiple feature paths included in the first decision tree.

Each of the multiple feature paths included in the first decision tree includes a feature and a reference eigenvalue, and the feature path matching the feature sequence is obtained from the multiple feature paths according to the feature and the reference eigenvalue and the feature sequence.

Figure 2C:
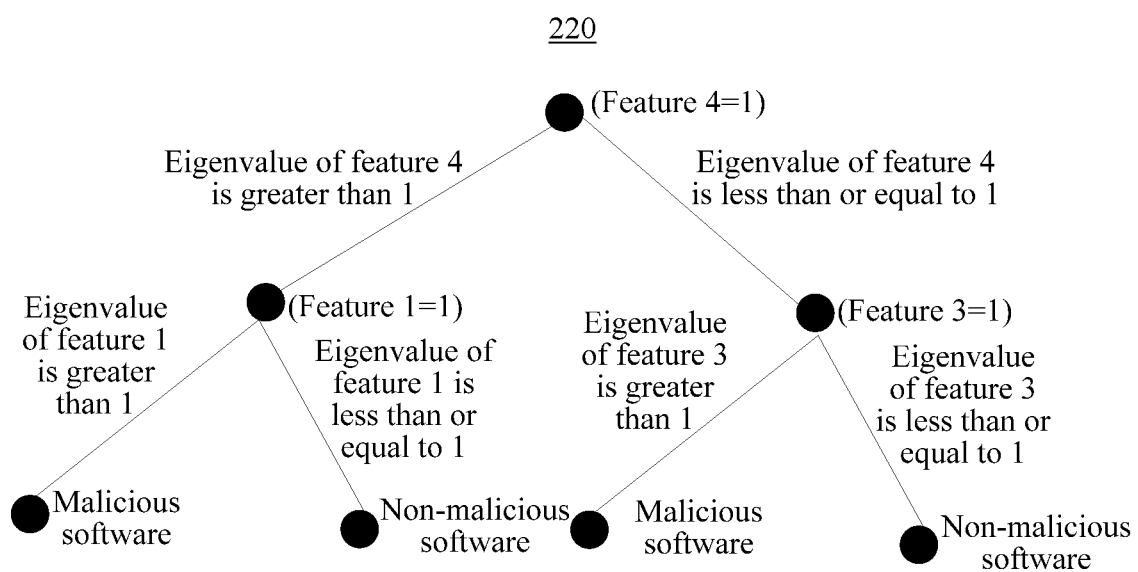
FIG. 2C is a schematic diagram of a decision tree according to Embodiment 2.

For example, the feature sequence includes feature 1=1, feature 2=2, feature 3=0, and feature 4=2, and then a feature path matching the feature sequence is selected from the first decision tree 220 in FIG. 2C as feature $$4 = 1 \xrightarrow{eigenvalue\ of\ feature\ 4\ is\ greater\ than\ 1}$$

feature $$1 = 1 \xrightarrow{eigenvalue\ of\ feature\ 4\ is\ less\ than\ or\ equal\ to\ 1}$$

identification result (non-malicious software).

(B): Use an identification result corresponding to the selected feature path as an identification result of the first decision tree.

Each feature path corresponds to an identification result, and the identification result corresponding to the selected feature path is the identification result of the first decision tree.

For example, the selected feature path is feature $$4 = 1 \xrightarrow{eigenvalue\ of\ feature\ 4\ is\ greater\ than\ 1}$$

feature $$1 = 1 \xrightarrow{eigenvalue\ of\ feature\ 4\ is\ less\ than\ or\ equal\ to\ 1}$$

identification result (non-malicious software), the identification result corresponding to the selected feature path is that the software is non-malicious software, and then the identification result of the first decision tree is that the software is non-malicious software.

An identification result of each decision tree is obtained according to steps (A) and (B), and then step 207 is performed.

Step 207: Collect, according to the identification result of each decision tree, statistics on a quantity of first results that the identification result is that the software is malicious software and a quantity of second results that the software is non-malicious software.

Step 208: Determine, according to a comparison result of the quantity of first results and the quantity of second results, whether the software is malicious software.

Determine that the software is malicious software if the quantity of first results is greater than the quantity of second results. Determine that the software is non-malicious software if the quantity of first results is not greater than the quantity of second results.

Further, after obtaining the identification result of the software, the server may store the identification result in an installation package of the software, so that the terminal may obtain the identification result of the software from the installation package of the software when installing the software. If the identification result of the software is that the software is malicious software, the terminal may reject to install the software.

Further, the server may also establish a correspondence between a version number of the software and the identification result of the software, so that the terminal or the server queries the identification result of the software according to the version number of the software. In addition, after the server establishes the correspondence between the version number of the software and the identification result of the software, when the server receives the to-be-detected software, the server determines, according to a version number of the to-be-detected software, whether the software is identified, and if the software is identified, directly obtains the identification result of the software according to the version number of the to-be-detected software. Identification does not need to be performed again.

In this embodiment, a function call diagram of the software is obtained according to a source code of to-be-detected software; a feature sequence of the software is generated according to the function call diagram, the feature sequence including an eigenvalue of at least one feature, the feature being a function in a preset function library, and the eigenvalue of the feature being a quantity of times of calling of the function by the software; and whether the software is malicious software is identified according to the feature sequence and a random forest, the random forest including at least one decision tree, and the decision tree including reference eigenvalues of multiple features. In the present disclosure, whether the software is malicious software is identified by using the feature sequence and the random forest, so as not to be affected by a virus creator, thereby improving identification accuracy.

Embodiment 3

Figure 3A:
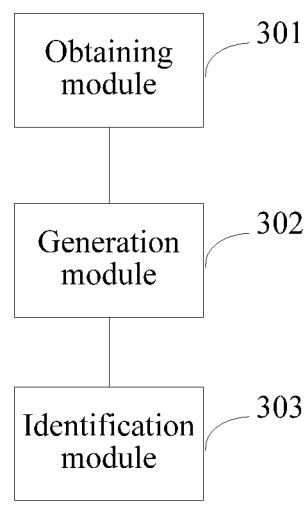
FIG. 3A is a schematic structural diagram of an apparatus for identifying malicious software according to Embodiment 3.

An embodiment provides an apparatus for identifying malicious software. The apparatus may be configured to perform the method for identifying malicious software in Embodiment 1 and Embodiment 2. Referring to FIG. 3A, such an apparatus 300 includes:

an obtaining module 301, configured to, obtain, according to a source code of to-be-detected software, a function call diagram of the software;

a generation module 302, configured to generate a feature sequence of the software according to the function call diagram, the feature sequence including an eigenvalue of at least one feature, the feature being a function in a preset function library, and the eigenvalue of the feature being a quantity of times of calling of the function by the software; and an identification module 303, configured to identify whether the software is malicious software according to the feature sequence and a random forest, the random forest including at least one decision tree, and the decision tree including reference eigenvalues of multiple features.

Figure 3B:
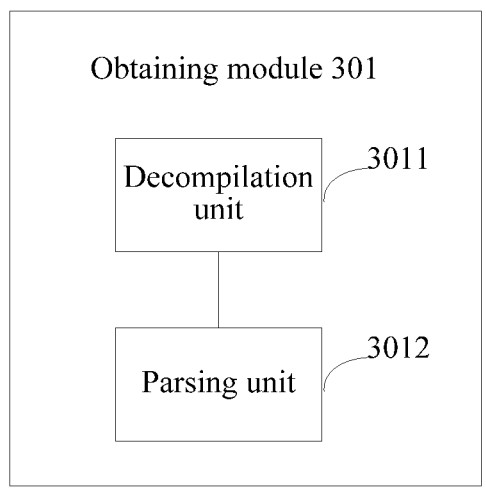
FIG. 3B is a schematic structural diagram of an apparatus of an obtaining module according to Embodiment 3.

Optionally, referring to FIG. 3B, the obtaining module 301 includes:

a decompilation unit 3011, configured to decompile the source code of the to-be-detected software, to obtain a decompilation code of the software; and a parsing unit 3012, configured to parse the decompilation code, to obtain the function call diagram of the software.

Figure 3C:
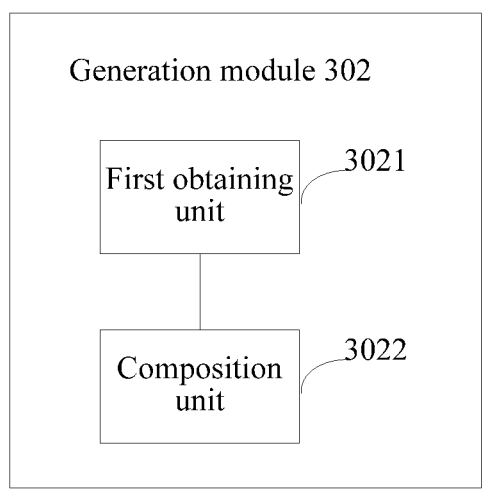
FIG. 3C is a schematic structural diagram of an apparatus of a generation module according to Embodiment 3.

Optionally, referring to FIG. 3C, the generation module 302 includes:

a first obtaining unit 3021, configured to obtain a quantity of times of calling of each function by the software in the preset function library according to the function call diagram; and a composition unit 3022, configured to compose the quantity of times of calling of each function into the feature sequence of the software.

Optionally, the feature further includes rights in a preset right library, and the eigenvalue of the feature is used for indicating whether the right is an eigenvalue accessed by the software.

Figure 3D:
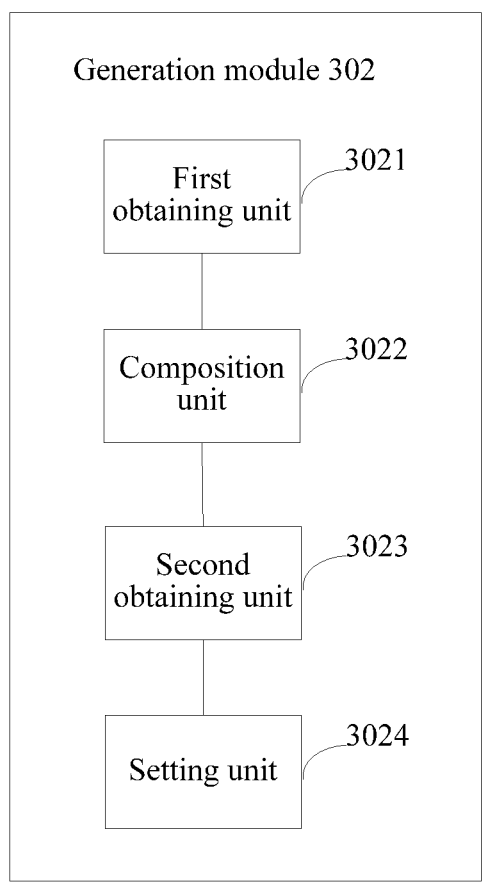
FIG. 3D is a schematic structural diagram of an apparatus of another generation module according to Embodiment 3.

Referring to FIG. 3D, the generation module 302 may further include:

a second obtaining unit 3023, configured to obtain an access right of being requested to access by the software and a non-access right of not being requested to access by the software in the preset right library according to a right of the software for requesting access; and a setting unit 3024, configured to set an eigenvalue of the access right to a first value and set an eigenvalue of the non-access right to a second value; and the composition unit 3022 is configured to compose the quantity of times of calling of each function and an eigenvalue of each right in the preset right library into the feature sequence of the software.

Figure 3E:
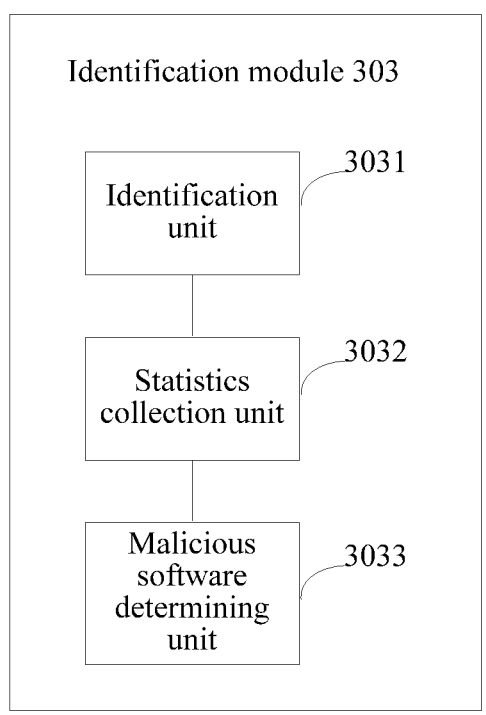
FIG. 3E is a schematic structural diagram of an apparatus of an identification module according to Embodiment 3.

Optionally, referring to FIG. 3E, the identification module 303 includes:

an identification unit 3031, configured to identify whether the software is malicious software according to each decision tree included in the random forest and the feature sequence, to obtain an identification result corresponding to each decision tree;

a statistics collection unit 3032, configured to collect, according to the identification result of each decision tree, statistics on a quantity of first results that the identification result is that the software is malicious software and a quantity of second results that the software is non-malicious software; and a malicious software determining unit 3033, configured to determine, according to a comparison result of the quantity of first results and the quantity of second results, whether the software is malicious software; and for example, determine that the software is malicious software if the quantity of first results is greater than the quantity of second results, and determine that the software is non-malicious software if the quantity of first results is not greater than the quantity of second results.

Optionally, the decision tree in the random forest includes multiple feature paths, each of the multiple feature paths includes multiple reference eigenvalues, and each feature path corresponds to an identification result.

Figure 3F:
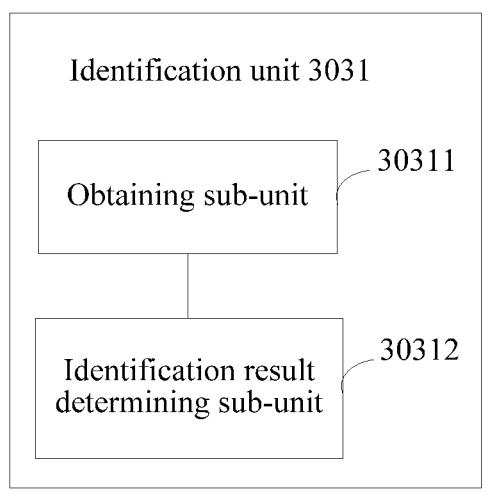
FIG. 3F is a schematic structural diagram of an apparatus of an identification unit according to Embodiment 3.

Referring to FIG. 3F, the identification unit 3031 comprises:

an obtaining sub-unit 30311, configured to obtain a feature path matching the feature sequence from multiple feature paths included in a first decision tree according to the feature sequence, where the first decision tree is any decision tree in the random forest; and an identification result determining sub-unit 30312, configured to use an identification result corresponding to the selected feature path as an identification result of the first decision tree.

Figure 3G:
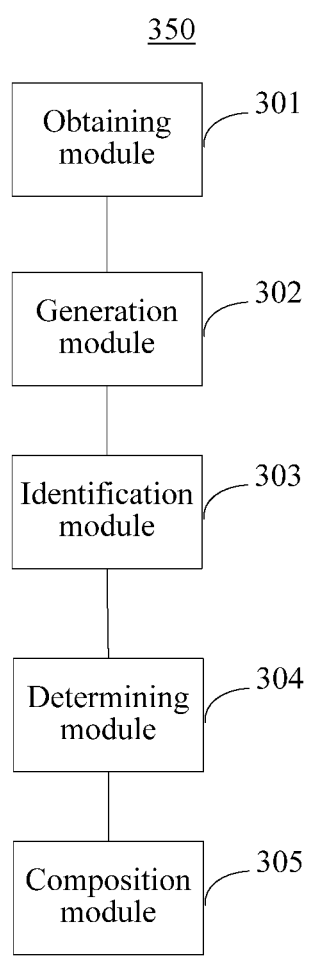
FIG. 3G is a schematic structural diagram of another apparatus for identifying malicious software according to Embodiment 3.

Optionally, referring to FIG. 3G, an apparatus 350 includes:

a determining module 304, configured to determine, according to a sample feature sequence set, a location, in the decision tree, of each of some features in the sample feature sequence set and a reference eigenvalue of each feature, where the sample feature sequence set includes a sample feature sequence of at least one piece of malicious software and a sample feature sequence of at least one piece of non-malicious software; and a composition module 305, configured to compose the reference eigenvalue of each feature into the decision tree according to the location, in the decision tree, of each feature.

In this embodiment, a function call diagram of the software is obtained according to a source code of to-be-detected software; a feature sequence of the software is generated according to the function call diagram, the feature sequence including an eigenvalue of at least one feature, the feature being a function in a preset function library, and the eigenvalue of the feature being a quantity of times of calling of the function by the software; and whether the software is malicious software is identified according to the feature sequence and a random forest, the random forest including at least one decision tree, and the decision tree including reference eigenvalues of multiple features. In the present disclosure, whether the software is malicious software is identified by using the feature sequence and the random forest, so as not to be affected by a virus creator, thereby improving identification accuracy.

Embodiment 4

Figure 4:
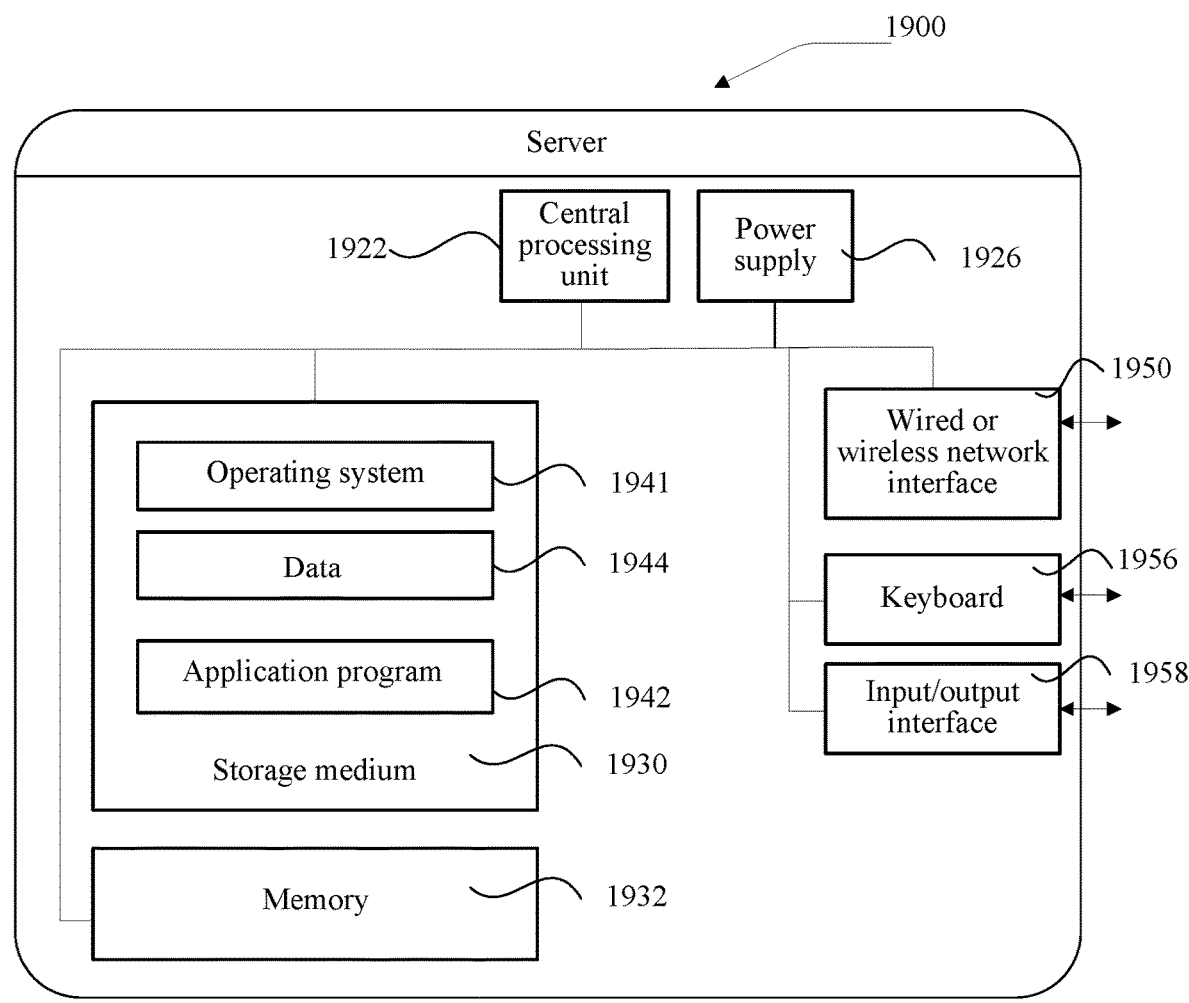
FIG. 4 is a schematic structural diagram of a server according to Embodiment 4.

FIG. 4 is a schematic structural diagram of a server according to an embodiment. The server provides a hardware running environment to the foregoing information platform. The server 1900 may vary greatly due to different configurations or performance, and may include one or more central processing units (CPUs) 1922 (for example, one or more processors) and a memory 1932, and one or more storage media 1930 (for example, one or more mass storage devices) that store application programs 1942 or data 1944. Storage of the memory 1932 and the storage medium 1930 may be transient or persistent storages. A program stored in the storage medium 1930 may include one or more modules (not shown in the figure), and each module may include a series of instructions and operations for the server. Still furthermore, the CPU 1922 may be configured to communicate with the storage medium 1930, and perform, on the server 1900, a series of instructions and operations in the storage medium 1930.

The server 1900 may further include one or more power supplies 1926, one or more wired or wireless network interfaces 1950, one or more input/output interfaces 1958, one or more keyboards 1956, and/or one or more operating systems 1941, for example, Windows Server™, Mac OS X™, Unix™, Linux™, or FreeBSD™.

The server 1900 may include a memory and one or more programs. The one or more programs are stored in the memory and configured to be executed by one or more processors. The one or more programs contain instructions used for performing the following operations:

obtaining, according to a source code of to-be-detected software, a function call diagram of the software;

generating a feature sequence of the software according to the function call diagram, the feature sequence including an eigenvalue of at least one feature, the feature being a function in a preset function library, and the eigenvalue of the feature being a quantity of times of calling of the function by the software; and identifying whether the software is malicious software according to the feature sequence and a random forest, the random forest including at least one decision tree, and the decision tree including reference eigenvalues of multiple features.

Optionally, the obtaining, according to a source code of to-be-detected software, a function call diagram of the software includes:

decompiling the source code of the to-be-detected software, to obtain a decompilation code of the software; and parsing the decompilation code, to obtain the function call diagram of the software.

Optionally, the generating a feature sequence of the software according to the function call diagram includes:

obtaining a quantity of times of calling of each function by the software in the preset function library according to the function call diagram; and composing the quantity of times of calling of each function into the feature sequence of the software.

Optionally, the feature further includes rights in a preset right library, and the eigenvalue of the feature is used for indicating whether the right is an eigenvalue accessed by the software;

before the composing the quantity of times of calling of each function into the feature sequence of the software, the method further includes:

obtaining an access right of being requested to access by the software and a non-access right of not being requested to access by the software in the preset right library according to a right of the software for requesting access; and setting an eigenvalue of the access right to a first value and setting an eigenvalue of the non-access right to a second value; and the composing the quantity of times of calling of each function into the feature sequence of the software includes:

composing the quantity of times of calling of each function and an eigenvalue of each right in the preset right library into the feature sequence of the software.

Optionally, the identifying whether the software is malicious software according to the feature sequence and a random forest includes:

identifying whether the software is malicious software according to each decision tree included in the random forest and the feature sequence, to obtain an identification result corresponding to each decision tree;

collecting, according to the identification result of each decision tree, statistics on a quantity of first results that the identification result is that the software is malicious software and a quantity of second results that the software is non-malicious software;

determining that the software is malicious software if the quantity of first results is greater than the quantity of second results; and determining that the software is non-malicious software if the quantity of first results is not greater than the quantity of second results.

Optionally, the decision tree in the random forest includes multiple feature paths, each of the multiple feature paths includes multiple reference eigenvalues, and each feature path corresponds to an identification result;

the identifying whether the software is malicious software according to each decision tree included in the random forest and the feature sequence, to obtain an identification result corresponding to each decision tree includes:

obtaining a feature path matching the feature sequence from multiple feature paths included in a first decision tree according to the feature sequence, where the first decision tree is any decision tree in the random forest; and using an identification result corresponding to the selected feature path as an identification result of the first decision tree.

Optionally, the method further includes:

determining, according to a sample feature sequence set, a location, in the decision tree, of each of some features in the sample feature sequence set and a reference eigenvalue of each feature, where the sample feature sequence set includes a sample feature sequence of at least one piece of malicious software and a sample feature sequence of at least one piece of non-malicious software; and composing the reference eigenvalue of each feature into the decision tree according to the location, in the decision tree, of each feature.

In this embodiment, a function call diagram of the software is obtained according to a source code of to-be-detected software; a feature sequence of the software is generated according to the function call diagram, the feature sequence including an eigenvalue of at least one feature, the feature being a function in a preset function library, and the eigenvalue of the feature being a quantity of times of calling of the function by the software; and whether the software is malicious software is identified according to the feature sequence and a random forest, the random forest including at least one decision tree, and the decision tree including reference eigenvalues of multiple features. In the present disclosure, whether the software is malicious software is identified by using the feature sequence and the random forest, so as not to be affected by a virus creator, thereby improving identification accuracy.

It should be noted that division of the foregoing functional modules is only described for exemplary purposes when the apparatus for identifying malicious software provided in the foregoing embodiments identifies malicious software. In actual application, the foregoing functions may be allocated to be accomplished by different functional modules according to requirements, that is, the internal structure of the apparatus is divided into different functional modules, to accomplish all or a part of functions of the above described functions. Besides, the apparatus for identifying malicious software provided in the foregoing embodiments and embodiments of the method for identifying malicious software belong to a same concept. Refer to the method embodiments for details of a specific implementation process. Details are not described herein.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments, but are not intended to limit the present disclosure. Any modification, equivalent replacement, or improvement made within the spirit and principle of the present disclosure shall all fall within the protection scope of the present disclosure.

What is claimed is:

1. A method for identifying malicious software implemented by a server, the method comprising:

obtaining, according to a source code of a software detected on a terminal, a function call diagram of the software;

generating a feature sequence of the software according to the function call diagram, the feature sequence comprising an eigenvalue of at least one feature of the software, wherein the at least one feature is a function included in a preset function library, and wherein the eigenvalue of the at least one feature is a quantity of times the function is called by the software; and determining whether the software is malicious software according to the feature sequence and a random forest, the random forest comprising at least one decision tree comprising reference eigenvalues of multiple features of the software.

2. The method according to claim 1, wherein the obtaining, according to the source code of the software, the function call diagram of the software comprises:

decompiling the source code of the software;

obtaining a decompilation code of the software based on the decompiling;

parsing the decompilation code; and obtaining the function call diagram based on the parsing of the decompiliation code.

3. The method according to claim 1, wherein generating the feature sequence of the software according to the function call diagram comprises:

obtaining a quantity of times each function in the preset function library is called by the software in the preset function library according to the function call diagram; and composing the quantity of times each function is called into the feature sequence of the software.

4. The method according to claim 3, wherein the at least one feature further comprises rights in a preset right library, and the eigenvalue of the at least one feature is used for indicating whether the right is an eigenvalue accessed by the software;

wherein before composing the quantity of times each function is called into the feature sequence of the software, the method further comprising:

obtaining an access right of being requested to access by the software and a non-access right of not being requested to access by the software in the preset right library according to a right of the software for requesting access; and setting an eigenvalue of the access right to a first value and setting an eigenvalue of the non-access right to a second value; and wherein composing the quantity of times each function is called into the feature sequence of the software further comprises:

including an eigenvalue of each right in the preset right library into the feature sequence of the software.

5. The method according to claim 1, wherein identifying whether the software is malicious software according to the feature sequence and a random forest comprises:

determining whether the software is malicious software according to each decision tree comprised in the random forest and the feature sequence, to obtain an identification result corresponding to each decision tree;

collecting, according to the identification result of each decision tree, statistics on a quantity of first results that the identification result is that the software is malicious software and statistics on a quantity of second results that the software is non-malicious software; and determining, according to a comparison result of the quantity of first results and the quantity of second results, whether the software is malicious software.

6. The method according to claim 5, wherein the decision tree in the random forest comprises multiple feature paths, each of the multiple feature paths comprises multiple reference eigenvalues, and each feature path corresponds to an identification result;

wherein determining whether the software is malicious software according to each decision tree comprised in the random forest and the feature sequence, to obtain the identification result corresponding to each decision tree, comprises:

obtaining a feature path matching the feature sequence from multiple feature paths comprised in a first decision tree according to the feature sequence, wherein the first decision tree is any decision tree in the random forest; and using an identification result corresponding to the obtained feature path as an identification result of the first decision tree.

7. The method according to claim 1, further comprising:
determining, according to a sample feature sequence set, a location in the decision tree of a feature in the sample feature sequence set and a reference eigenvalue of the feature, wherein the sample feature sequence set comprises a sample feature sequence of at least one piece of malicious software and a sample feature sequence of at least one piece of non-malicious software; and composing the reference eigenvalue of the feature into the decision tree according to the location in the decision tree of the feature.

8. An apparatus for identifying malicious software, the apparatus comprising:
a processing circuitry; and
a non-transitory storage medium configured to store executable instructions that, when executed, cause the processing circuitry to:
execute an obtaining module to obtain, according to a source code of a software, a function call diagram of the software;
execute a generation module to generate a feature sequence of the software according to the function call diagram, the feature sequence comprising an eigenvalue of at least one feature of the software, wherein the at least one feature is a function in a preset function library, and wherein the eigenvalue of the at least one feature is a quantity of times of calling of the function by the software; and
execute an identification module to determine whether the software is malicious software according to the feature sequence and a random forest, the random forest comprising at least one decision tree comprising reference eigenvalues of multiple features.

9. The apparatus according to claim 8, wherein the non-transitory storage medium is configured to further store executable instructions that, when executed, cause the processing circuitry to:

execute the obtaining module to decompile the source code of the to-be-detected software, and obtain a decompilation code of the software based on the decompiled source code; and
execute the obtaining module to parse the decompilation code, and obtain the function call diagram of the software based on the parsing of the decompilation code.

10. The apparatus according to claim 8, wherein the non-transitory storage medium is configured to further store executable instructions that, when executed, cause the processing circuitry to:
execute the generation module to obtain a quantity of times each function is called by the software in the preset function library according to the function call diagram; and
execute the generation module to compose the quantity of times each function is called into the feature sequence of the software.

11. The apparatus according to claim 10, wherein the feature further comprises rights in a preset right library, and the eigenvalue of the at least one feature is used for indicating whether the right is an eigenvalue accessed by the software;
wherein the non-transitory storage medium is configured to further store executable instructions that, when executed, cause the processing circuitry to:
execute the generation module to obtain an access right of being requested to access by the software and a non-access right of not being requested to access by the software in the preset right library according to a right of the software for requesting access; and
execute the generation module to set an eigenvalue of the access right to a first value and set an eigenvalue of the non-access right to a second value; and
execute the generation module to include an eigenvalue of each right in the preset right library into the feature sequence of the software.

12. The apparatus according to claim 8, wherein the non-transitory storage medium is configured to further store executable instructions that, when executed, cause the processing circuitry to:
execute the identification module to determine whether the software is malicious software according to each decision tree comprised in the random forest and the feature sequence, to obtain an identification result corresponding to each decision tree;
execute the identification module to collect, according to the identification result of each decision tree, statistics on a quantity of first results that the identification result is that the software is malicious software and statistics on a quantity of second results that the software is non-malicious software; and
execute the identification module to determine, according to a comparison result of the quantity of first results and the quantity of second results, whether the software is malicious software.

13. The apparatus according to claim 12, wherein the decision tree in the random forest comprises multiple feature paths, each of the multiple feature paths comprises multiple reference eigenvalues, and each feature path corresponds to an identification result;
wherein the non-transitory storage medium is configured to further store executable instructions that, when executed, cause the processing circuitry to:
execute the identification module to obtain a feature path matching the feature sequence from multiple feature paths comprised in a first decision tree according to the feature sequence, wherein the first decision tree is any decision tree in the random forest; and execute the identification module to use an identification result corresponding to the obtained feature path as an identification result of the first decision tree.

14. The apparatus according to claim 8, non-transitory storage medium is configured to further store executable instructions that, when executed, cause the processing circuitry to:

execute a determining module to determine, according to a sample feature sequence set, a location in the decision tree of a feature in the sample feature sequence set and a reference eigenvalue of each feature, wherein the sample feature sequence set comprises a sample feature sequence of at least one piece of malicious software and a sample feature sequence of at least one piece of non-malicious software; and execute a composition module to compose the reference eigenvalue of the feature into the decision tree according to the location in the decision tree of the feature.

15. An apparatus for identifying malicious software, comprising one or more processors and a non-transitory storage medium storing operation instructions, wherein executing the operation instructions causes the processors to:

obtain, according to a source code of a software detected on a terminal, a function call diagram of the software;

generate a feature sequence of the software according to the function call diagram, the feature sequence comprising an eigenvalue of at least one feature of the software, wherein the at least one feature is a function included in a preset function library, and wherein the eigenvalue of the at least one feature is a quantity of times the function is called by the software; and determine whether the software is malicious software according to the feature sequence and a random forest, the random forest comprising at least one decision tree comprising reference eigenvalues of multiple features of the software.

16. The apparatus according to claim 15, wherein executing the operation instructions causes the processors to further:

decompile the source code of the software;
obtain a decompilation code of the software based on the decompiling;
parse the decompilation code; and
obtain the function call diagram based on the parsing of the decompiliation code.

17. The apparatus according to claim 15, wherein executing the operation instructions causes the processors to generate the feature sequence of the software according to the function call diagram by:

obtaining a quantity of times each function in the preset function library is called by the software in the preset function library according to the function call diagram; and composing the quantity of times each function is called into the feature sequence of the software.

18. The apparatus according to claim 17, wherein the at least one feature further comprises rights in a preset right library, and the eigenvalue of the at least one feature is used for indicating whether the right is an eigenvalue accessed by the software;

wherein before composing the quantity of times of calling of each function into the feature sequence of the software, the processors are further configured to:

obtain an access right of being requested to access by the software and a non-access right of not being requested to access by the software in the preset right library according to a right of the software for requesting access; and set an eigenvalue of the access right to a first value and set an eigenvalue of the non-access right to a second value; and wherein the processors are configured to compose the quantity of times each function is called into the feature sequence of the software by further including an eigenvalue of each right in the preset right library into the feature sequence of the software.

19. The apparatus according to claim 15, wherein executing the operation instructions causes the processors to identify whether the software is malicious software according to the feature sequence and a random forest by:

determining whether the software is malicious software according to each decision tree comprised in the random forest and the feature sequence, to obtain an identification result corresponding to each decision tree;

collecting, according to the identification result of each decision tree, statistics on a quantity of first results that the identification result is that the software is malicious software and statistics on a quantity of second results that the software is non-malicious software; and determining, according to a comparison result of the quantity of first results and the quantity of second results, whether the software is malicious software.

20. The apparatus according to claim 19, wherein the decision tree in the random forest comprises multiple feature paths, each of the multiple feature paths comprises multiple reference eigenvalues, and each feature path corresponds to an identification result;

wherein the processors are further configured to:

obtain a feature path matching the feature sequence from multiple feature paths comprised in a first decision tree according to the feature sequence, wherein the first decision tree is any decision tree in the random forest; and use an identification result corresponding to the obtained feature path as an identification result of the first decision tree.

* * * * *